(12) United States Patent
Chen

(10) Patent No.: US 8,007,187 B1
(45) Date of Patent: Aug. 30, 2011

(54) SINGLE LENS REFLEX CAMERA WITH ELECTRO-OPTICAL REFLEX APPARATUS

(76) Inventor: Andrew Chen, Cupertino, CA (US)

( * ) Notice: Subject to any disclaimer, the term of this patent is extended or adjusted under 35 U.S.C. 154(b) by 0 days.

(21) Appl. No.: 12/789,384

(22) Filed: May 27, 2010

(51) Int. Cl.
  *G03B 15/00* (2006.01)
  *G03B 19/12* (2006.01)
  *H04N 5/225* (2006.01)
(52) U.S. Cl. .................. 396/352; 396/358; 348/374
(58) Field of Classification Search .................. 396/352, 396/351, 354, 358; 348/374
See application file for complete search history.

(56) References Cited

U.S. PATENT DOCUMENTS

2008/0204587 A1* 8/2008 Takahara et al. ......... 348/333.01
* cited by examiner

*Primary Examiner* — Rochelle-Ann J Blackman

(57) ABSTRACT

A lens-interchangeable single-lens reflex camera system according to the present invention employs a novel reflex apparatus comprising stationary "smart glass" elements. The "smart glass" elements switch between transparent and non-transparent states in response to applied electrical voltage, allowing for silent, solid-state control of the optical light path from an external scene image. The optical transmittances of the "smart glass" elements are electronically regulated to provide the operator with a representation of the scene image through the optical viewfinder during the inactive observation period, and to alternately allow the external light to reach the image-sensing device during a photographic exposure.

5 Claims, 3 Drawing Sheets

1

SINGLE LENS REFLEX CAMERA WITH ELECTRO-OPTICAL REFLEX APPARATUS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of the Invention

The present invention relates to single-lens reflex cameras, and more particularly to a reflex apparatus disposed in such cameras for reflecting a scene image to an optical viewfinder to enable the operator to compose the picture and focus the lens.

2. Description of the Prior Art

The single-lens reflex camera has long been popular among photographers on account of, among other features, the capability for the operator to observe an exact representation of the image prior to an exposure by means of an optical viewfinder. The elimination of parallax error ensures accurate scene composition and permits the operator to corroborate the lens focus in real-time.

The prior art single-lens reflex camera comprises several components in a well-known design. A reflex mirror is mounted on a hinge, which allows for rotational movement between two positions. The first mirror position is the observation position, wherein the reflex mirror intersects the principal optical light path between the objective lens and the image-sensing device at an angle that is oblique to said light path. In the observation position, the reflex mirror reflects the principal optical light path upward into the optical viewfinder, enabling the operator to observe the scene image through the same perspective and focus as the image-sensing device. To affect an exposure, the operator actuates the shutter-release button. Immediately prior to the opening of the shutter, the reflex mirror is retracted out of the principal optical light path, pivoting about the hinge until it reaches the second mirror position, henceforth referred to as the photographic position. In the photographic position, the reflex mirror is situated parallel to the focusing screen to allow light from the objective lens to fall incident upon the image-sensing device, which may be of the photographic film or electronic (digital) sensor type. While in the photographic position, the reflex mirror also serves to block stray light from entering the chamber through the optical viewfinder. Once the predetermined exposure time value has lapsed, the shutter closes and the reflex mirror is returned to the observation position, wherein the operator is able to resume monitoring the scene image through the optical viewfinder.

The prior art single-lens reflex camera suffers from inherent design limitations. The movement of the reflex mirror between the observation and photographic positions creates vibrations in the camera body that can produce motion-blur artifacts in acquired images. The noises of the reflex mirror striking the terminus positions during operation prevent the practical use of single-lens reflex cameras in circumstances when silence is required. Additionally, substantial space is required forward of the reflex mirror to prevent a collision with the rearmost element of the photographic objective lens when the mirror is swung upward, which contributes to the size of the camera. Furthermore, the mechanism for inserting and retracting the reflex mirror from the principal optical light path requires precise manufacturing tolerances and a large number of moving parts, which makes it especially susceptible to damage from shocks and drops. Ever-increasing image acquisition rates introduce significant mechanical difficulties for the operation of the reflex mirror mechanism. Current single-lens reflex cameras are capable of acquiring up to 11 images per second; the mechanical stresses associated with swinging a reflex mirror from the observation position to the photographic position and back 11 times a second precipitate issues such as frictional wear and material fatigue.

One prior art attempt to address these limitations has been to replace the movable reflex mirror of a conventional single-lens reflex camera with a stationary, half-silvered pellicle mirror (Pellix, Canon Inc., 1965). The pellicle mirror is permanently affixed in the aforementioned observation position, likewise intersecting the principal optical light path at an oblique angle. Due to the semi-transparency of the pellicle mirror, a portion of the light passing through the lens system is reflected to the optical viewfinder while the remaining portion of light is transmitted to the image-sensing device. This design enables the operator to continuously monitor and compose the scene image even while affecting exposures, since the mirror does not swing up and induce a viewfinder blackout. However, since the pellicle mirror splits the available incoming light into two parts, it cannot provide the viewfinder with an optimal reflection of the scene image, nor can provide the image-sensing device with an optimal transmission of the light during an exposure. Nevertheless, the use of a pellicle mirror mitigates some of the limitations of the conventional single-lens reflex camera by eliminating the complex moving mirror mechanism, along with the noise and vibration consequent to its action.

It is now prudent to discuss the topic of "smart glass," as it is an integral component of the present invention. Smart glass, also commonly known as "switchable glass," "intelligent glass" or "privacy glass," refers to a class of materials whose light transmission properties change reversibly in response to the application of electrical voltage. Electrochromics (ECs), suspended particle devices (SPDs), and polymer dispersed liquid crystals (PDLCs) are examples of technologies employed in smart glass. Some types of smart glass are characterized by their ability to switch reversibly between transparent and opaque states in response to an applied electrical voltage, and will henceforth be referred to as "T/O smart glass." Advancements in material research pertaining to transition-metal hydrides have led to the development of reflective hydride electrochromics, which become specularly reflective, as opposed to opaque. This technology pertains to a subcategory of smart glass that has the ability to switch reversibly between transparent and reflective states in response to an applied electrical voltage, and will henceforth be referred to as "T/R smart glass."

SUMMARY OF THE INVENTION

A reflex apparatus of a single-lens reflex camera according to the present invention comprises two distinct smart glass elements which are characterized by their ability to reversibly switch between transparent and non-transparent states in response to an applied voltage from an electronic control unit. A T/R smart glass element, one which switches between transparent and reflective states under electronic control, is disposed fixedly in a position corresponding to the observation position of a reflex mirror in a prior art single-lens reflex camera. A T/O smart glass element, one which switches between transparent and opaque states under electronic control, is disposed fixedly in a position corresponding to the photographic position of a reflex mirror in a prior art single-lens reflex camera.

It is therefore a principal object of the present invention to provide a single-lens reflex camera with an electro-optical reflex apparatus to control the principal optical light path of a scene image entering through the photographic objective lens by selectively reflecting the light path to the operator via the optical viewfinder, or transmitting said light path to the image-sensing device for recording.

Another object of the present invention is to minimize the space required for the reflex apparatus in a single-lens reflex camera.

A further object of the present invention is to eliminate the use of moving parts in the reflex apparatus and shutter mechanism of a single-lens reflex camera in the interest of increasing mechanical durability and reducing operational noise and vibration.

Yet another object of the present invention is to allow for increased image acquisition rates in a single-lens reflex camera by negating the time required to physically displace a reflex mirror from one position to another during an exposure cycle.

An additional object of the present invention is to provide an electro-optical reflex apparatus that is economical to manufacture and incorporate into a single-lens reflex camera.

Still further objects of the present invention, along with the various features of novelty which characterize the present invention, are set forth with particularity in the claims annexed to and forming a part of this disclosure.

BRIEF DESCRIPTION OF THE DRAWINGS

The present invention will be described below in detail with reference to the accompanying drawings, in which.

DETAILED DESCRIPTION OF THE INVENTION

Hereinafter, an embodiment of a single-lens reflex camera which employs the present invention will be described in detail with reference to the accompanying drawings.

Figure 1:
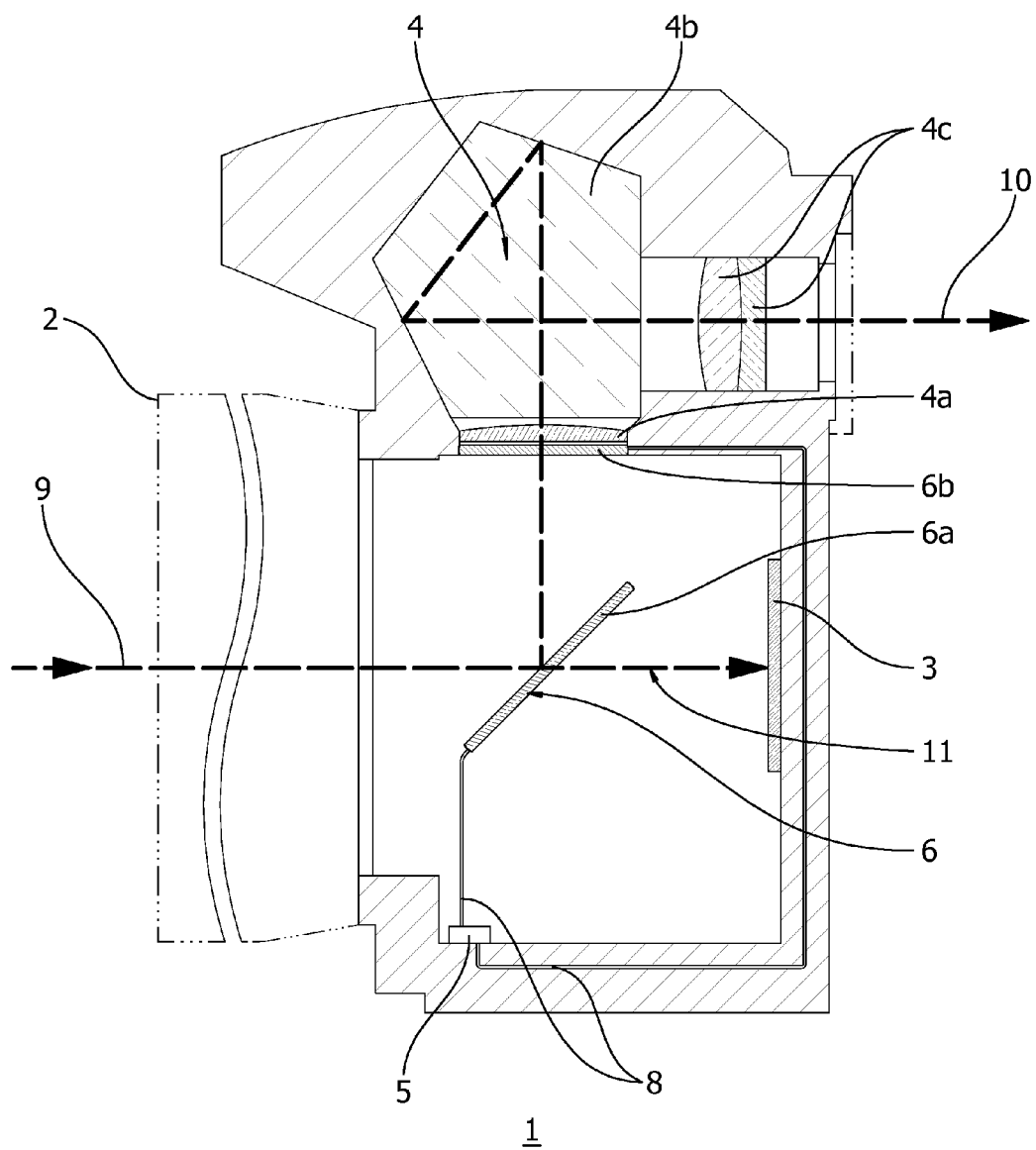
FIG. 1 shows a sectional view of an electro-optical reflex apparatus employed in a single-lens reflex camera according to a preferred embodiment of the present invention.

FIG. 1 is a sagittal sectional view showing the configuration of a single-lens reflex camera 1 embodying the present invention. The single-lens reflex camera 1 comprises an interchangeable photographic objective lens 2, an image-sensing device 3 which may be photographic film or an electronic (digital) sensor coupled to an image processing unit and associated storage media, an optical viewfinder 4, an electronic control unit 5, and a reflex apparatus 6. The reflex apparatus 6, in turn, comprises a T/R smart glass element 6a which switches between transparent and reflective states under electronic control, and a T/O smart glass element 6b which switches between transparent and opaque states under electronic control. A shutter-release button 7, which is interfaced with the electronic control unit 5, is disposed upon the exterior of the camera body.

The T/R smart glass element 6a is disposed fixedly between the photographic objective lens 2 and the image-sensing device 3, in a position corresponding to the observation position of the reflex mirror in a prior art single-lens reflex camera. Observed in a sagittal sectional view, the T/R smart glass element 6a is positioned at an oblique angle in relation to the principal optical light path 9. The T/O smart glass element 6b is immovably disposed parallel and adjacently inferior to the focusing screen 4a, in a position corresponding to the photographic position of a reflex mirror in a prior art single-lens reflex camera. The smart glass elements 6a, 6b are individually connected to the camera's electronic control unit 5 with conductive wires 8.

The optical viewfinder 4 is composed of a focusing screen 4a, a pentaprism 4b, and an eyepiece lens 4c. The focusing screen 4a is disposed at an orientation that is parallel to the principal optical light path 9.

Figure 2:
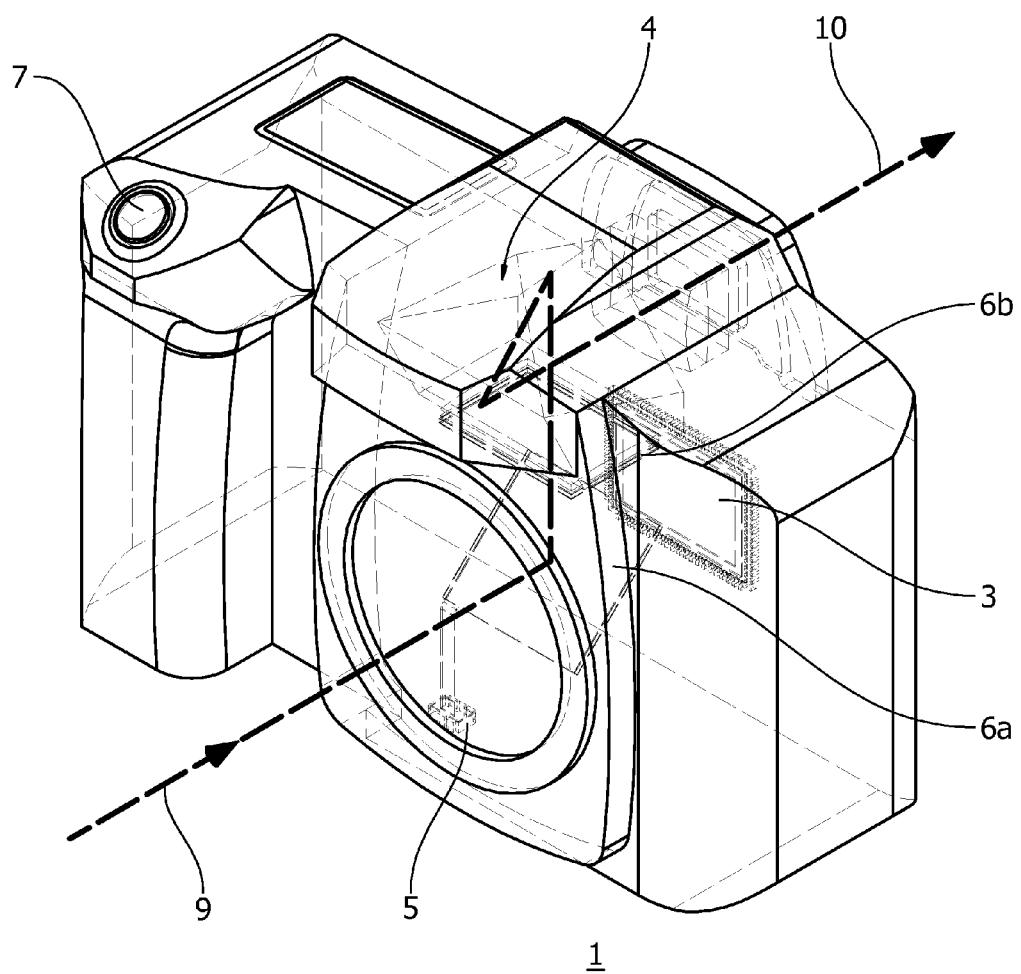
FIG. 2 shows a wireframe isometric view of the arrangement from FIG. 1 during the inactive observation state.
Figure 3:
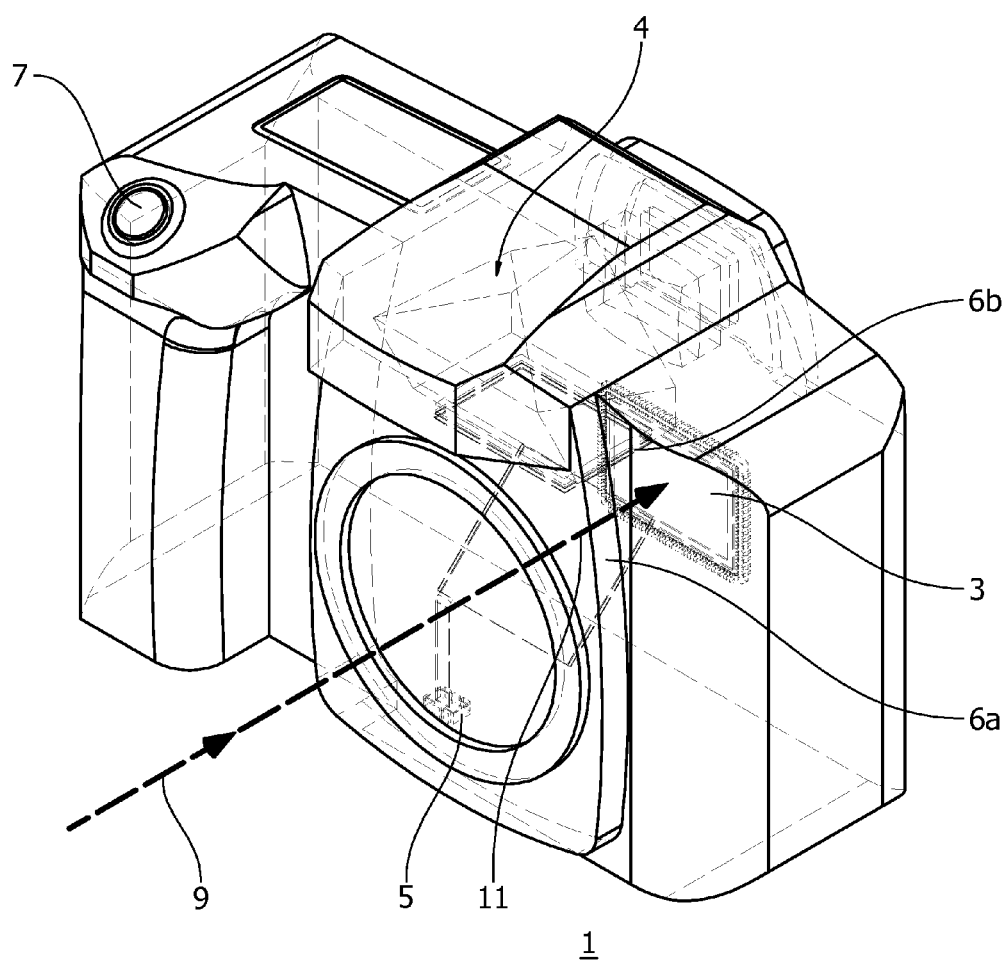
FIG. 3 shows a wireframe isometric view of the arrangement from FIG. 1 during a photographic exposure.

FIGS. 2 and 3 are wireframe isometric views showing the single-lens reflex camera 1 and respective consequent optical light paths 10, 11 during different states of operation. The photographic objective lens 2 and the embedded wire 8 connecting the T/O smart glass element 6b to the electronic control unit 5 have been omitted from these figures in the interest of clarity.

FIG. 2 shows the single-lens reflex camera 1 during the observation period. Here, the camera's electronic control unit 5 maintains the T/R smart glass element 6a in its reflective state, and the T/O smart glass element 6b in its transparent state. Under these conditions, light from the external scene image is transmitted through the photographic objective lens 2 along the principal optical light path 9, reflecting off the surface of the T/R smart glass element 6a upward through the transparent T/O smart glass element 6b to the focusing screen 4a. The operator is therefore able to observe the scene image through the optical viewfinder 4 and make adjustments to its composition and focus. During the observation period, the exposure time value may be set manually by the operator, or calculated by the camera's electronic control unit 5 using photometric data received from a light meter.

FIG. 3 depicts the single-lens reflex camera 1 during a photographic exposure. The operator elects to acquire an exposure by depressing the shutter-release button 7. This causes the camera's electronic control unit 5 to send a signal to the T/R smart glass element 6a, switching it from reflective to transparent. Simultaneously, the electronic control unit 5 sends a signal to the T/O smart glass element 6b, causing it to switch from transparent to opaque. Thus, light from the external scene image passes through the photographic objective lens 2 along the principal optical light path 9 and passes through the transparent T/R smart glass element 6a onto the surface of the image-sensing device 3, which is disposed perpendicularly to the principal optical light path 9. The opaque T/O smart glass element 6b prevents stray light from entering through the optical viewfinder 4 and contaminating the exposure. Once the predetermined exposure time value has lapsed, the electronic control unit 5 reverts the reflex assembly 6 to the observation state, wherein the T/R smart glass element 6a is returned to its reflective state and the T/O smart glass element 6b is returned to its transparent state. The operator is therefore able to resume observation of the scene image through the optical viewfinder 4.

The present invention is not limited to the above described embodiment, but can be modified as appropriate within a scope not departing from the spirit or thought of the present invention that can be read from the claims of the patent application and the whole specification, and such a modified camera is also included in the technical scope of the present invention.

What is claimed is:

1. A single-lens reflex camera comprising:
    an interchangeable photographic objective lens for collecting and focusing light from an external scene;
    an image-sensing device, which may be photographic film or an electronic (digital) sensor coupled to an image processing unit and associated storage media, for recording photographic data from light received from the photographic objective lens;
    an optical viewfinder for providing the operator with a visible representation of the scene image as seen by the image-sensing device through the photographic objective lens;
    a reflex apparatus containing materials with adjustable optical transmission properties to selectively direct incoming light from the objective lens to the image-sensing device and optical viewfinder.

2. A single-lens reflex camera as claimed in claim 1, wherein the reflex apparatus comprises:
    a T/R smart glass element, which switches between transparent and reflective states under electronic control, disposed fixedly at an oblique angle and intersecting the principal optical path between the photographic objective lens and the image-sensing device;
    a T/O smart glass element, which switches between transparent and opaque states under electronic control, immovably disposed parallel and adjacently inferior to the focusing screen of the optical viewfinder assembly.

3. A single-lens reflex camera as claimed in claim 2, further comprising:
    an electronic control unit for regulating the optical transmission properties of the smart glass elements by means of electrical signals transmitted through conductive wires.

4. A single-lens reflex camera as claimed in claim 3, wherein during the inactive observation period, the electronic control unit maintains the T/R smart glass element in its reflective state, and the T/O smart glass element in its transparent state to enable the operator to view the scene image through the optical viewfinder.

5. A single-lens reflex camera as claimed in claim 3, wherein upon activation of a photographic exposure, the electronic control unit switches the T/R smart glass element to its transparent state, and the T/O smart glass element to its opaque state to allow light from the external scene to fall upon the image-sensing device for a predetermined period of time before reverting to the inactive observation state.

* * * * *